United States Patent
Park et al.

(10) Patent No.: US 8,731,034 B2
(45) Date of Patent: May 20, 2014

(54) METHOD AND SYSTEM OF PAYLOAD ENCODING AND MODULATION FOR CHANNEL QUALITY FEEDBACK

(75) Inventors: Sungki Park, Ashburn, VA (US); Durga Prasad Satapathy, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 356 days.

(21) Appl. No.: 13/053,405

(22) Filed: Mar. 22, 2011

(65) Prior Publication Data

US 2012/0243591 A1   Sep. 27, 2012

(51) Int. Cl.
*H04B 17/00*   (2006.01)

(52) U.S. Cl.
USPC ........................................ 375/224

(58) Field of Classification Search
CPC . H04L 27/3405; H04L 27/3461; H04L 1/003; H04L 5/0007; H04L 5/0051; H04L 1/0003; H04L 1/0009; H04L 1/0026; H04W 52/365
USPC .......... 370/210, 241, 338, 342; 455/445, 452, 455/522
See application file for complete search history.

(56) References Cited

U.S. PATENT DOCUMENTS

| | | | |
|---|---|---|---|
| 2005/0201295 A1* | 9/2005 | Kim et al. ...................... | 370/241 |
| 2006/0293074 A1* | 12/2006 | Bottomley et al. ............ | 455/522 |
| 2007/0254603 A1* | 11/2007 | Li et al. ........................... | 455/88 |
| 2010/0014500 A1* | 1/2010 | Lee et al. ...................... | 370/342 |

* cited by examiner

*Primary Examiner* — Jae Y Lee
*Assistant Examiner* — Jean F Voltaire

(57) ABSTRACT

The present invention relates to a method, a computer readable medium, and a system of payload encoding and modulation and, more particularly, to a method, a computer readable medium, and a system of payload encoding and modulation for channel quality feedback. A method includes sending a Channel Quality Indicator (CQI) in a x-bit modulation scheme, and after sending the CQI, sending at least one CQI in a y-bit modulation scheme, the at least one CQI indicating one of an increment and a decrement of a previous CQI. The method further includes detecting a trigger event, and when the trigger event is detected, sending the CQI in the x-bit modulation scheme.

20 Claims, 12 Drawing Sheets

METHOD AND SYSTEM OF PAYLOAD ENCODING AND MODULATION FOR CHANNEL QUALITY FEEDBACK

TECHNICAL FIELD

The present invention relates to a method, a computer readable medium, and a system of payload encoding and modulation and, more particularly, to a method, a computer readable medium, and a system of payload encoding and modulation for channel quality feedback.

BACKGROUND

In a mobile communications network, a mobile station (MS) may send various communications to a base station (BS). Such communication may include information regarding a changing condition of a communications channel between the MS and the BS. This channel information may include, for example, a physical carrier-to-interference-plus-noise ratio (PCINR), an effective CINR (ECINR), and a received signal strength indicator (RSSI).

Further, the channel information sent from the MS to the BS may include, for instance, a channel quality indicator (CQI). A CQI is a measurement of a quality of the communication channel between the MS and the BS. A CQI can be a value representing a measure of the quality for a given channel, where a high value of the CQI is indicative of a channel with a high quality and vice versa. A CQI for a channel may be determined based on performance metrics, such as, for example, a signal-to-interference plus noise ratio (SINR), a signal-to-noise plus distortion ratio (SNDR), of the channel. A CQI for a channel can also be dependent upon transmission (modulation and coding) schemes used by a mobile communications network. For instance, a network using code-division multiple access (CDMA) can utilize a different CQI than a network using orthogonal frequency division multiplexing (OFDM).

However, to send channel information from a MS to a BS, frequency and time dimension sub-channels between user devices (including the MS) and the BS must be allocated to send such channel information. Since the frequency sub-channels are capacity-limited, as more of the sub-channels are allocated to send channel information between the single MS and the BS, less of the sub-channels can be allocated to other user devices. As such, the sending of channel information from the MS to the BS adversely affects a total number of active users that can be supported by a mobile communications network, thereby decreasing user experience.

Accordingly, there exists a need in the art to overcome the deficiencies and limitations described hereinabove.

SUMMARY

In a first aspect of the invention, a method includes sending a Channel Quality Indicator (CQI) in a x-bit modulation scheme, and after sending the CQI, sending at least one CQI in a y-bit modulation scheme, the at least one CQI indicating one of an increment and a decrement of a previous CQI. The method further includes detecting a trigger event, and when the trigger event is detected, sending the CQI in the x-bit modulation scheme.

In another aspect of the invention, a computer readable medium storing computer executable instructions, the instructions, when executed, configuring one or more processors to perform the functions of sending a Channel Quality Indicator (CQI) in a x-bit modulation scheme, and after sending the CQI, sending at least one CQI in a y-bit modulation scheme, the at least one CQI indicating one of an increment and a decrement of a previous CQI. The one or more processors are further configured to perform the functions of detecting a trigger event, and when the trigger event is detected, sending the CQI in the x-bit modulation scheme.

In yet another aspect of the invention, a system includes one or more processors configured to send a Channel Quality Indicator (CQI) in a x-bit modulation scheme, and after sending the CQI, send at least one CQI in a y-bit modulation scheme, the at least one CQI indicating one of an increment and a decrement of a previous CQI. The one or more processors are further configured to detect a trigger event, and when the trigger event is detected, send the CQI in the x-bit modulation scheme. The trigger event includes at least one of a detection of at least one of an accuracy issue, a need for additional information to be delivered, a determination that a bit error rate (BER) is within at least one predetermined range, and a determination that a mobile station transmission power head room is within at least one predetermined range. A predetermined percentage of CQI channels are allocated to send one CQI per user device in the x-bit modulation scheme, and a remaining percentage of the CQI channels are allocated to send the one CQI in the y-bit modulation scheme. At least one user device of a network is categorized in a channel conditions stable group, and at least one other user device of the network is categorized in a channel conditions unstable group. When a percentage of the CQI channels allocated to send the one CQI in the x-bit modulation scheme is equal to zero, and a CQI channel is needed to send the one CQI in the x-bit modulation scheme, at least one CQI channel allocated to send the one CQI in the y-bit modulation scheme from the at least one user device in the channel conditions stable group is reallocated to send the one CQI in the x-bit modulation scheme.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
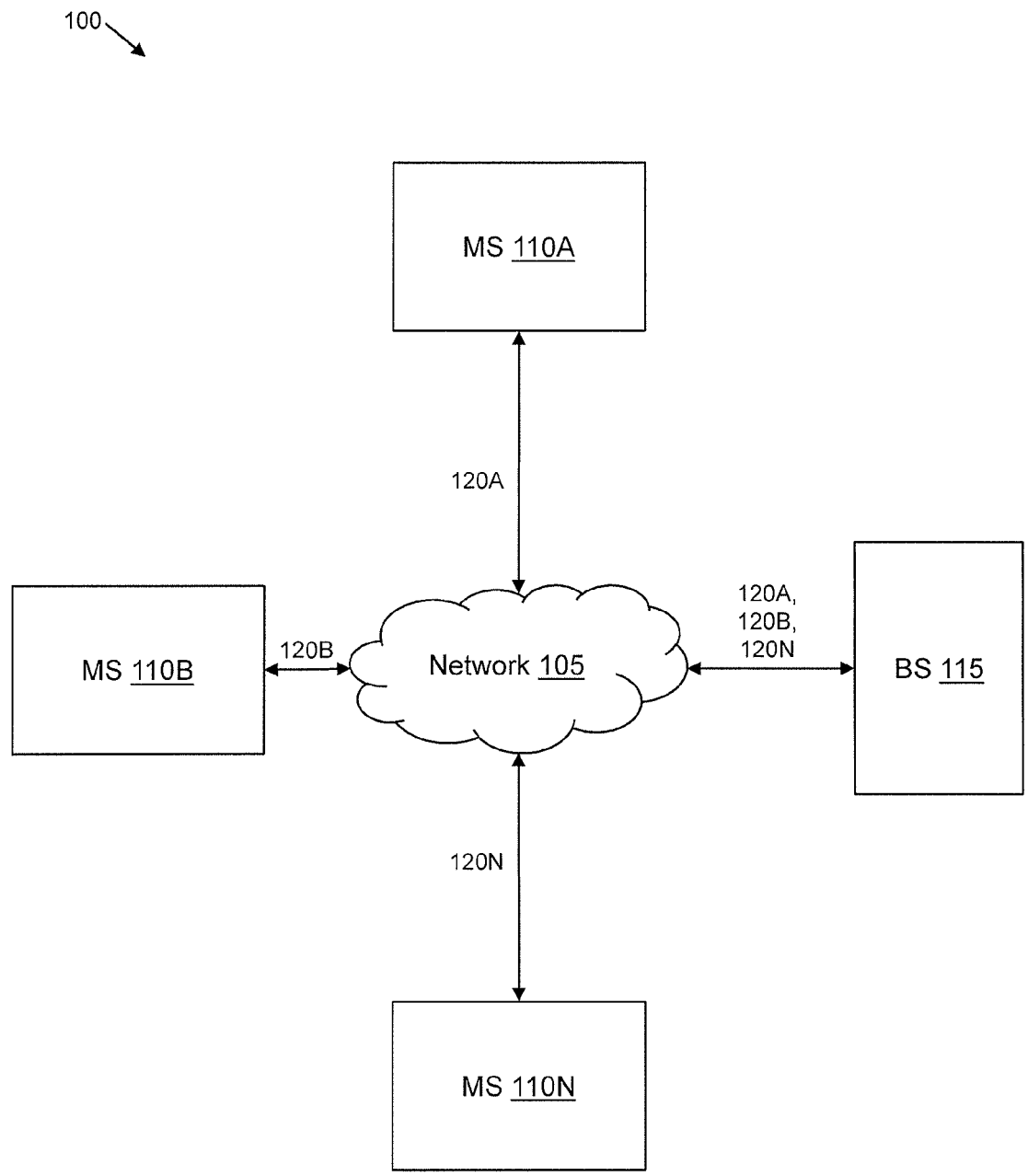
FIG. 1 is a block diagram that shows an exemplary system of payload encoding and modulation for channel quality feedback in accordance with aspects of the invention.

The present invention relates to a method, a computer readable medium, and a system of payload encoding and modulation and, more particularly, to a method, a computer readable medium, and a system of payload encoding and modulation for channel quality feedback. Specifically, the system of the present invention includes a mobile station (MS) operable to encode and modulate a channel quality indicator (CQI) sent from the MS to a base station (BS) in a x-bit or larger-bit modulation scheme and in a y-bit or smaller-bit modulation scheme. In embodiments, the x-bit modulation scheme and the y-bit modulation may include, for example, a 6-bit modulation scheme and a 3-bit modulation scheme, respectively. A CQI encoded and modulated in the y-bit or 3-bit modulation scheme indicates an increment or a decrement of a previous CQI. For example, when a CQI level is determined to be 8, and a previous CQI level is 10, a CQI encoded and modulated in the 3-bit modulation scheme may include bits "010", to indicate a decrement of −2 CQI levels from the previous CQI level of 10. The MS is operable to send a CQI in the y-bit or 3-bit modulation scheme until it is necessary to send a CQI in the x-bit or 6-bit modulation scheme.

Further, the system of the present invention includes a BS operable to determine a trigger event indicating that is it is necessary for a MS to send a CQI in the x-bit or 6-bit modulation scheme instead of the y-bit or 3-bit modulation scheme. In embodiments, the trigger event may include, for example, an accuracy issue regarding a received CQI, a need for additional information to be delivered regarding a received CQI, a determination that a bit error rate (BER) is within at least one predetermined range, and a determination that a MS transmission (Tx) power head room is within at least one predetermined range. When the BS determines that a trigger event has occurred, the BS is operable to send to a MS a trigger event signal indicating to the MS that a trigger event has occurred and that the MS should send a next CQI in the x-bit modulation scheme instead of the y-bit modulation scheme.

Advantageously, the present invention allows communication channels between user devices (e.g., a MS) and a BS to be allocated to an additional number of simultaneous user devices since the y-bit or 3-bit modulation scheme requires less channels and/or time to send a CQI. In addition, the present invention allows a MS to send the y-bit or 3-bit modulation scheme until it is necessary to send a CQI in the x-bit or 6-bit modulation scheme, further increasing the number of user devices that may be allocated channels. Moreover, through a CQI channel (CQICH) allocation scheme, CQICH's may be optimally allocated for a maximum capacity of user devices by allocating CQICH's to send a CQI in the y-bit modulation scheme, only when necessary, while maintaining channel stability. The present invention enhances customer experience and network efficiency by allowing an increase in a total number of active users that can be supported per network via making better use of channel quality feedback channel resources.

FIG. 1 is a block diagram that shows an exemplary system 100 of payload encoding and modulation for channel quality feedback in accordance with aspects of the invention. The system 100 includes a network 105. In embodiments, the network 105 may include any one or more of, for instance, the Internet, a cellular network, and/or a WiMAX (Worldwide Interoperability for Microwave Access) network. The network 105 may include a plurality of computing systems operable to transfer data packets and/or radio signals within the network 105 and between computing devices connected to the network 105.

The system 100 further includes a MS 110A, a MS 110B, . . . , and a MS 110N (hereinafter "MS 110" for convenience) that are connected to the network 105. In embodiments, the MS 110 may include any one or more of, for example, a personal computer and/or a mobile phone. The system 100 further includes a BS 115 communicably coupled on respective communication channels (not shown) to the MS 110 via the network 105. The BS 115 may include any one or more of, for instance, a wireless router, a cell site, and/or a WiMAX base station.

Communications 120A, 120B, . . . , and 120N (hereinafter "communications 120" for convenience) may be transferred between the MS 110 and the BS 115. In embodiments, the communications 120 may include a CQI sent from the MS 110 to the BS 115. The CQI is a measurement of a quality of the communication channels between the MS 110 and the BS 115. The CQI can be a value representing a measure of a quality for a given channel, where a high value of the CQI is indicative of a channel with a high quality and vice versa. The CQI for a channel may be determined by making use of performance metrics, such as, for example, a signal-to-interference plus noise ratio (SINR), a signal-to-noise plus distortion ratio (SNDR), and a carrier to interference-plus-noise ratio (CINR), of the channel. The CQI for a channel can also be dependent upon transmission (modulation and coding) schemes used by the system 100. For instance, a communications system using quadrature phase-shift keying (QPSK) can make use of a different CQI than a communications system that makes use of quadrature amplitude modulation (QAM). Table 1 below shows an example of CQI values in a 6-bit modulation scheme (e.g., where there is a total of 31 CQI values) determined based on the CINR, and of an associated modulation and coding scheme (MCS) level for each of the CQI values.

TABLE 1

| CQI Value | CINR (dB) | MCS Level |
|---|---|---|
| 0 | −3 or less | QPSK 1/12 STC |
| 1 | −2 | QPSK 1/12 STC |
| 2 | −1 | QPSK 1/8 STC |
| 3 | 0 | QPSK 1/8 STC |
| 4 | 1 | QPSK 1/4 STC |
| 5 | 2 | QPSK 1/4 STC |
| 6 | 3 | QPSK 1/4 STC |
| 7 | 4 | QPSK 1/4 STC |
| 8 | 5 | QPSK 1/2 STC |
| 9 | 6 | QPSK 1/2 STC |
| 10 | 7 | QPSK 1/2 STC |
| 11 | 8 | QPSK 3/4 STC |
| 12 | 9 | QPSK 3/4 STC |
| 13 | 10 | QPSK 3/4 STC |
| 14 | 11 | 16QAM 1/2 STC |
| 15 | 12 | 16QAM 1/2 STC |
| 16 | 13 | 16QAM 1/2 STC |
| 17 | 14 | 16 QAM 3/4 STC |
| 18 | 15 | 16 QAM 3/4 STC |
| 19 | 16 | 16 QAM 3/4 STC |
| 20 | 17 | 64 QAM 2/3 STC |
| 21 | 18 | 64 QAM 2/3 STC |
| 22 | 19 | 64 QAM 3/4 STC |
| 23 | 20 | 64 QAM 5/6 STC |
| 24 | 21 | 64 QAM 5/6 STC |
| 25 | 22 | 64 QAM 5/6 STC |
| 26 | 23 | 64 QAM 5/6 STC |
| 27 | 24 | 64 QAM 1/2 SM |
| 28 | 25 | 64 QAM 1/2 SM |
| 29 | 26 | 64 QAM 1/2 SM |
| 30 | 27 | 64 QAM 2/3 SM |
| 31 | 28 | 64 QAM 2/3 SM |
|  | 29 | 64 QAM 2/3 SM |
|  | 30 | 64 QAM 3/4 SM |
|  | 31 | 64 QAM 3/4 SM |
|  | 32 | 64 QAM 3/4 SM |
|  | 33 or greater | 64 QAM 5/6 SM |

In another example, the CQI in the 6-bit modulation scheme may be determined based on the following equation:

$$CQI = \begin{cases} 0, & S/N \le -B \\ n, & (n-1-B) < (S/N) \le (n-B), 0 < n < 31, \\ 31, & S/N \ge 30 - B \end{cases} \quad (1)$$

where S/N is a signal-to-noise (S/N) ratio of a given channel, and B is a predetermined value, e.g., 3 dB.

Figure 2:
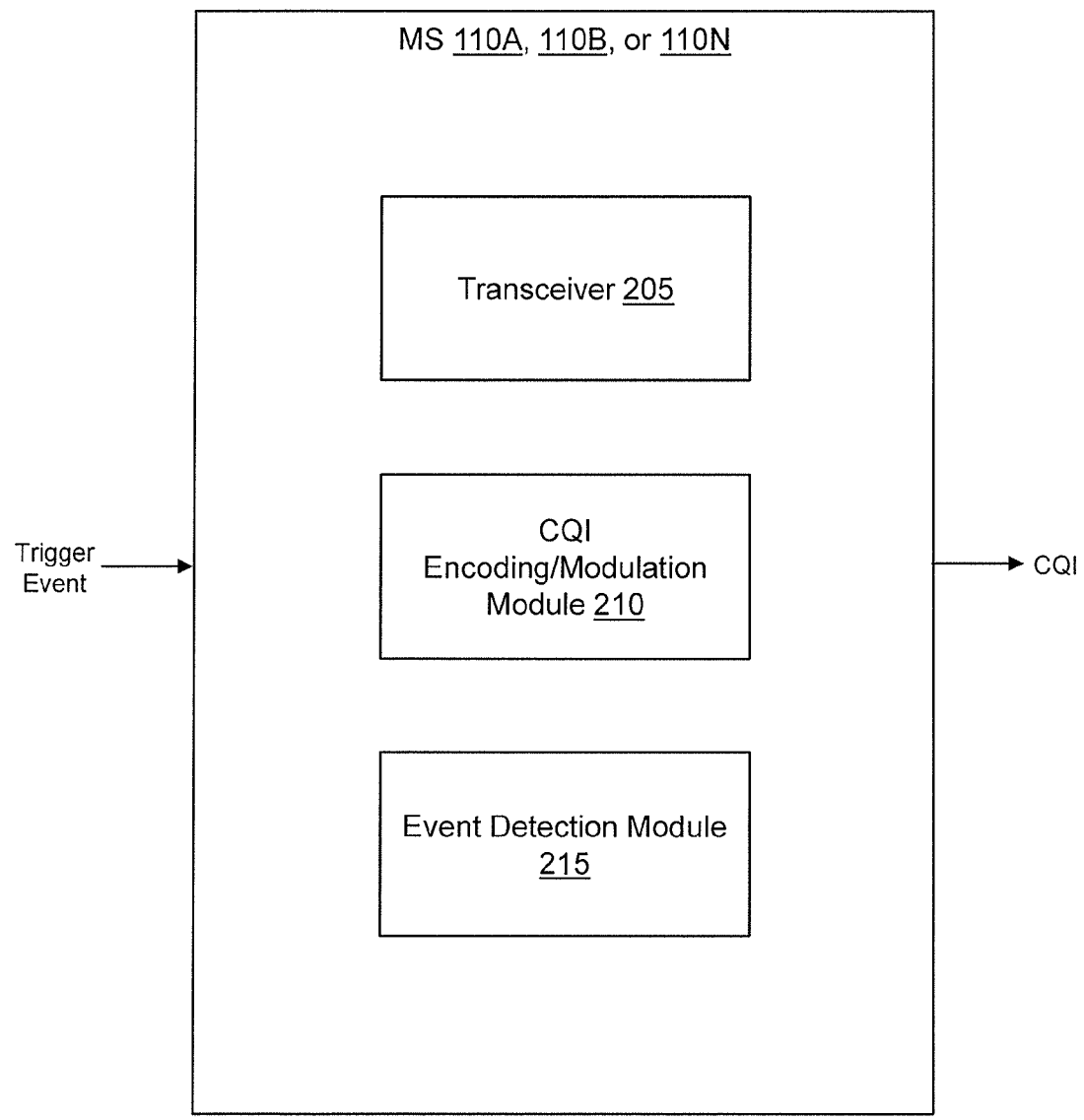
FIG. 2 is a block diagram that shows an exemplary mobile station (MS) of the system in FIG. 1 in accordance with aspects of the invention.

FIG. 2 is a block diagram that shows the MS 110 of the system 100 in FIG. 1 in accordance with aspects of the invention. In embodiments, the MS 110 may include a transceiver 205, a CQI encoding/modulation module 210, and an event detection module 215. The MS 110 can use the transceiver 205 to transmit to and to receive communications from the BS 115. The CQI encoding/modulation module 210 may determine the CQI of the communications channels between the MS 110 and the BS 115 based on the performance metrics including, for example, the CINR. Alternatively, the CQI encoding/modulation module 210 may receive the CQI from another module (not shown) operable to determine the CQI. The transceiver 205 may send the determined CQI from the MS 110 to the BS 115.

In embodiments, before the CQI is sent from the MS 110 to the BS 115, the CQI encoding/modulation module 210 may also encode and modulate the CQI in a x-bit modulation scheme or in a y-bit modulation scheme. For example, the x-bit modulation scheme may include a 6-bit modulation scheme where the CQI is encoded into a payload including 6-bits. For instance, when a CQI level is determined to be 10, an encoded 6-bit payload may include bits "001010". The 6-bit payload may further be modulated for transmission in uplink, fast-feedback communications channels between the MS 110 and the BS 115, using an orthogonal modulation scheme. Specifically, these fast-feedback channels are dedicated to send channel quality metrics, such as the CQI, from the MS 110 to the BS 115. The fast-feedback channels may be called tiles, and each of these tiles may include a fast-feedback vector index. Six fast-feedback vector indices in six tiles may represent a 6-bit payload. Table 2 below shows an example of fast-feedback vector indices per tile (e.g., Tile(0), Tile(1), . . . , and Tile(5)) for each of 6-bit payloads.

TABLE 2

| 6-Bit Payload (binary) | Fast-Feedback Vector Indices per Tile |
|---|---|
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 000101 | 5, 5, 5, 5, 5, 5 |
| 000110 | 6, 6, 6, 6, 6, 6 |
| 000111 | 7, 7, 7, 7, 7, 7 |
| 001000 | 2, 4, 3, 6, 7, 5 |
| 001001 | 3, 5, 2, 7, 6, 4 |
| 001010 | 0, 6, 1, 4, 5, 7 |
| 001011 | 1, 7, 0, 5, 4, 6 |
| 001100 | 6, 0, 7, 2, 3, 1 |
| 001101 | 7, 1, 6, 3, 2, 0 |
| 001110 | 4, 2, 5, 0, 1, 3 |
| 001111 | 5, 3, 4, 1, 0, 2 |
| 010000 | 4, 3, 6, 7, 5, 1 |
| 010001 | 5, 2, 7, 6, 4, 0 |
| 010010 | 6, 1, 4, 5, 7, 3 |
| 010011 | 7, 0, 5, 4, 6, 2 |
| 010100 | 0, 7, 2, 3, 1, 5 |
| 010101 | 1, 6, 3, 2, 0, 4 |
| 010110 | 2, 5, 0, 1, 3, 7 |
| 010111 | 3, 4, 1, 0, 2, 6 |
| 011000 | 3, 6, 7, 5, 1, 2 |
| 011001 | 2, 7, 6, 4, 0, 3 |
| 011010 | 1, 4, 5, 7, 3, 0 |
| 011011 | 0, 5, 4, 6, 2, 1 |
| 011100 | 7, 2, 3, 1, 5, 6 |
| 011101 | 6, 3, 2, 0, 4, 7 |
| 011110 | 5, 0, 1, 3, 7, 4 |
| 011111 | 4, 1, 0, 2, 6, 5 |
| 100000 | 6, 7, 5, 1, 2, 4 |
| 100001 | 7, 6, 4, 0, 3, 5 |
| 100010 | 4, 5, 7, 3, 0, 6 |
| 100011 | 5, 4, 6, 2, 1, 7 |
| 100100 | 2, 3, 1, 5, 6, 0 |
| 100101 | 3, 2, 0, 4, 7, 1 |
| 100110 | 0, 1, 3, 7, 4, 2 |
| 100111 | 1, 0, 2, 6, 5, 3 |
| 101000 | 7, 5, 1, 2, 4, 3 |
| 101001 | 6, 4, 0, 3, 5, 2 |
| 101010 | 5, 7, 3, 0, 6, 1 |
| 101011 | 4, 6, 2, 1, 7, 0 |
| 101100 | 3, 1, 5, 6, 0, 7 |
| 101101 | 2, 0, 4, 7, 1, 6 |
| 101110 | 1, 3, 7, 4, 2, 5 |
| 101111 | 0, 2, 6, 5, 3, 4 |
| 110000 | 5, 1, 2, 4, 3, 6 |
| 110001 | 4, 0, 3, 5, 2, 7 |
| 110010 | 7, 3, 0, 6, 1, 4 |
| 110011 | 6, 2, 1, 7, 0, 5 |
| 110100 | 1, 5, 6, 0, 7, 2 |
| 110101 | 0, 4, 7, 1, 6, 3 |
| 110110 | 3, 7, 4, 2, 5, 0 |
| 110111 | 2, 6, 5, 3, 4, 1 |
| 111000 | 1, 2, 4, 3, 6, 7 |
| 111001 | 0, 3, 5, 2, 7, 6 |
| 111010 | 3, 0, 6, 1, 4, 5 |
| 111011 | 2, 1, 7, 0, 5, 4 |
| 111100 | 5, 6, 0, 7, 2, 3 |

TABLE 2-continued

| 6-Bit Payload (binary) | Fast-Feedback Vector Indices per Tile |
|---|---|
| 111101 | 4, 7, 1, 6, 3, 2 |
| 111110 | 7, 4, 2, 5, 0, 1 |
| 111111 | 6, 5, 3, 4, 1, 0 |

For example, when a 6-bit payload includes the bits "001010", fast-feedback vector indices include "0, 6, 1, 4, 5, 7" for Tile(0), Tile(1), . . . , and Tile(5), respectively. Each of the fast-feedback vector indices indicate orthogonal modulation symbols $M_{n,m8}$, $M_{n,8m+1}$, . . . , and $M_{n,8m+7}$ that are mapped to subcarriers of a respective fast-feedback channel and that are sent from the MS 110 to the BS 115. Table 3 shows an example of the orthogonal modulation symbols $M_{n,m8}$, $M_{n,8m+1}$, . . . , and $M_{n,8m+7}$ for each of the fast-feedback vector indices.

TABLE 3

| Fast-Feedback Vector Index | $M_{n,m8}, M_{n,8m+1}, \ldots, M_{n,8m+7}$ |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

For example, when a fast-feedback vector index of Tile(0) is "0", as shown for the 6-bit payload "001010" discussed above, orthogonal modulation symbols $M_{n,m8}$, $M_{n,8m+1}$, . . . , and $M_{n,8m+7}$ include "P0, P1, P2, P3, P0, P1, P2, P3" for Tile(0). The orthogonal modulation symbols may be calculated by the following equations:

$$P0 = \exp\left(j \cdot \frac{\pi}{4}\right); \quad (2A)$$

$$P1 = \exp\left(j \cdot \frac{3\pi}{4}\right); \quad (2B)$$

$$P2 = \exp\left(-j \cdot \frac{3\pi}{4}\right); \text{ and} \quad (2C)$$

$$P4 = \exp\left(-j \cdot \frac{\pi}{4}\right). \quad (2D)$$

Alternatively, the CQI encoding/modulation module 210 may encode and modulate the CQI in the y-bit modulation scheme, which in embodiments, may be a 3-bit modulation scheme. In the 3-bit modulation scheme, the CQI is encoded into a 3-bit payload that indicates an increment or a decrement of a previous CQI. For example, when a CQI level is determined to be 8, and a previous CQI level is 10, an encoded 3-bit payload may include bits "010", to indicate a decrement of −2 CQI levels from the previous CQI level of 10. The 3-bit payload may be determined based on the following equation:

$$\text{3-Bit Payload} = \begin{cases} 0, & \text{no change in } n \text{ relative to previous report} \\ -y, & \begin{array}{l} y \text{ index decreased in } n \text{ relative to previous report,} \\ -3 \leq y \leq -1' \end{array} \\ +y, & \begin{array}{l} y \text{ index increased in } n \text{ relative to previous report,} \\ +1 \leq y \leq +4 \end{array} \end{cases} \quad (3)$$

where n is a CQI, and y is a change in the CQI from a previous CQI.

Table 4 shows two exemplary options of the 3-bit payload determined based on a change (e.g., an increment or decrement) in a CQI from a previous CQI.

TABLE 4

| 3-Bit Payload | Option 1 | Option 2 |
|---|---|---|
| 000 | No Change | No Change |
| 001 | −1 | −1 |
| 010 | −2 | −2 |
| 011 | −3 | −3 |
| 100 | +1 | −4 |
| 101 | +2 | +1 |
| 110 | +3 | +2 |
| 111 | +4 | +3 |

For example, under option 1, when a change in a current CQI (e.g., 14) from a previous CQI (e.g., 12) is +2, a 3-bit payload includes bits "101". Under option 2, when a change in a current CQI from a previous CQI is +2, a 3-bit payload includes bits "110". The 3-bit payload may further be modulated for transmission in the uplink, fast-feedback communications channels between the MS 110 and the BS 115, using an orthogonal modulation scheme. In contrast to the 6-bit modulation scheme, the 3-bit modulation scheme may require 3 fast-feedback vector indices in 3 tiles to represent a 3-bit payload. Advantageously, since the 3-bit modulation scheme requires less tiles or fast-feedback channels to represent a payload than the 6-bit modulation scheme, with the 3-bit modulation scheme, the additional tiles or channels may be reallocated to an additional number of simultaneous user devices, e.g., the MS 110. Table 5 shows an example of fast-feedback vector indices per tile (e.g., Tile(0), Tile(2), and Tile(4); or Tile(1), Tile(3), and (5)) for each of 3-bit payloads.

TABLE 5

| 3-Bit Payload (binary) | Fast-Feedback Vector Indices per Tile |
|---|---|
| 000 | 0, 0, 0 |
| 001 | 1, 1, 1 |
| 010 | 2, 2, 2 |
| 011 | 3, 3, 3 |
| 100 | 4, 4, 4 |
| 101 | 5, 5, 5 |
| 110 | 6, 6, 6 |
| 111 | 7, 7, 7 |

For example, when a payload includes the bits "010", fast-feedback vector indices include "2, 2, 2" for Tile(0), Tile(2), and Tile(4), respectively, or for Tile(1), Tile(3), and Tile(5), respectively. Each of the fast-feedback vector indices indicate orthogonal modulation symbols $M_{n,m8}$, $M_{n,8m+1}$, . . . , and $M_{n,8m+7}$ that are mapped to subcarriers of a respective fast-feedback channel and that are sent from the MS 110 to the BS 115. Table 3, illustrated above, shows an example of the orthogonal modulation symbols $M_{n,m8}$, $M_{n,8m+1}, \ldots,$ and $M_{n,8m+7}$ for each of the fast-feedback vector indices. For example, when a fast-feedback vector index of Tile(0) is "2", as shown for the 3-bit payload "010" discussed above, orthogonal modulation symbols $M_{n,m8}, M_{n,8m+1}, \ldots,$ and $M_{n,8m+7}$ include "P0, P0, P1, P1, P2, P2, P3, P3" for Tile(0).

The MS 110 further includes the event detection module 215 that detects a trigger event signal received from the BS 115. In embodiments, the trigger event signal may include, for example, an interrupt enable (IE) signal that indicates to the MS 110, specifically, the event detection module 215, that a trigger event has been determined by the BS 115. The trigger event signal further indicates that the MS 110 should send a next CQI in the x-bit or 6-bit modulation scheme. In response to detecting the trigger event signal, the event detection module 215 may communicate with the CQI encoding/modulation module 210 and instruct the CQI encoding/modulation module 210 to encode the next CQI in the x-bit modulation scheme. Advantageously, the MS 110 may send the y-bit (e.g., 3-bit) or smaller-bit modulation scheme until the MS 110 detects the trigger event signal received from the BS 115, further allowing additional channels to be reallocated to additional user devices.

Figure 3:
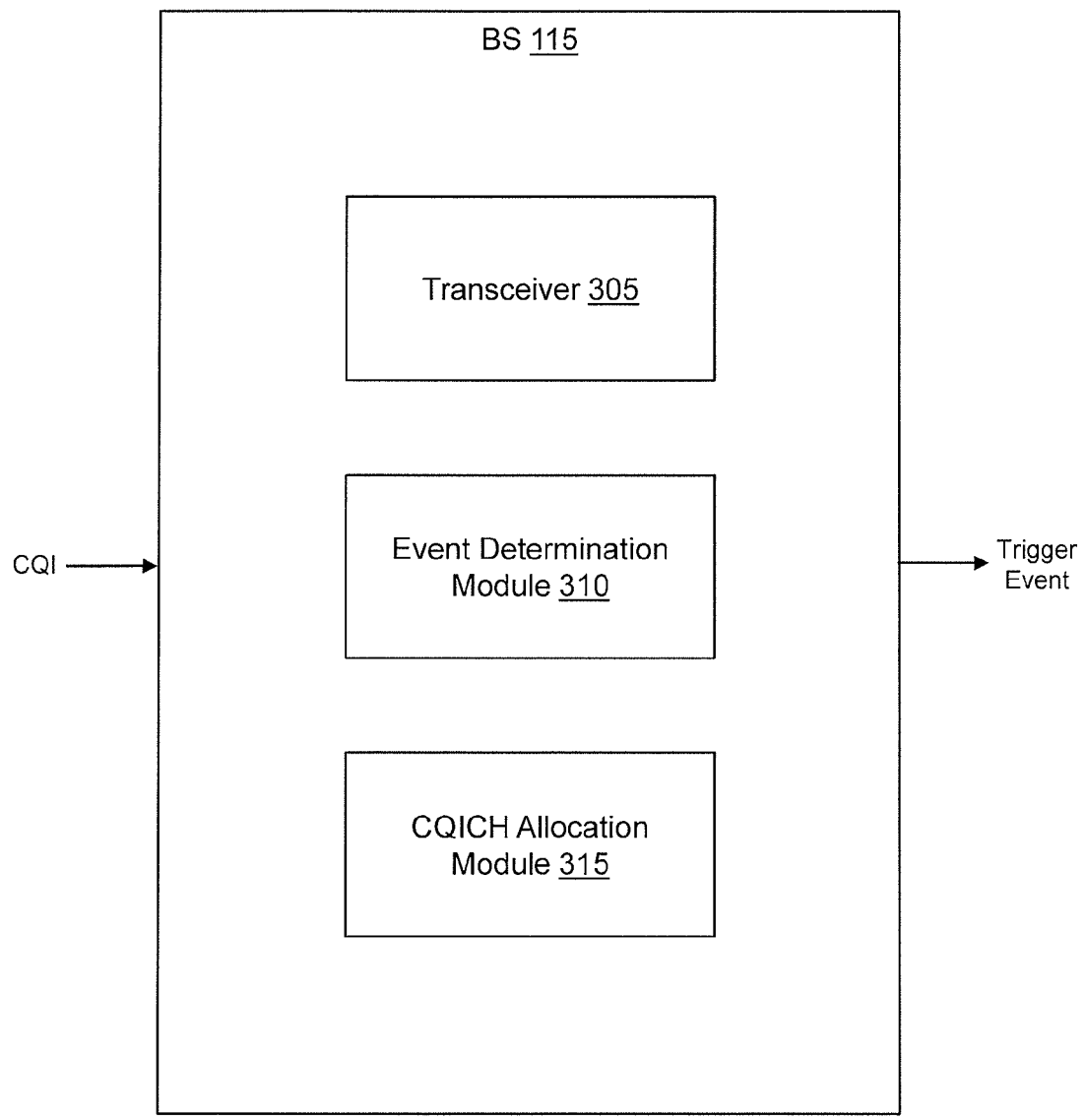
FIG. 3 is a block diagram that shows an exemplary base station (BS) of the system in FIG. 1 in accordance with aspects of the invention.

FIG. 3 is a block diagram that shows the BS 115 of the system 100 in FIG. 1 in accordance with aspects of the invention. In embodiments, the BS 115 may include a transceiver 305, an event determination module 310, and a CQICH allocation module 315. The BS 115 can use the transceiver 305 to transmit to and to receive communications, such as the CQI, from the MS 110. The event determination module 310 may determine that a trigger event has occurred and may generate the trigger event signal that indicates to the MS 110 that the trigger event has been determined by the BS 115, specifically, the event determination module 310.

In embodiments, a trigger event may include, for example, an accuracy issue or a need for additional information to be delivered. An accuracy issue or a need for additional information to be delivered may occur when, for instance, the CQI (and/or its orthogonal modulation symbols) cannot be accurately determined and/or read by the BS 115. In another example, an accuracy issue may occur when the CQI sent in the y-bit or 3-bit modulation scheme indicates a decrement of −2 CQI levels from a precious CQI level of 1, but the system 100 allows for only CQI levels greater than or equal to 0. In the case of an accuracy issue or a need for additional information to be delivered, the trigger event signal would be sent to indicate to the MS 110 that a next CQI should be sent in the x-bit or larger-bit modulation scheme, e.g., the 6-bit modulation scheme.

In embodiments, a trigger event may include a determination that a BER is within at least one predetermined range, e.g., the system 100 is operating outside its predetermined normal operating range of the BER. The BER is a number of bit errors divided by a total number of transferred bits during a predetermined time interval, and is expressed as a percentage. The BER may be determined by the BS 115 via the event detection module 310 and/or via a separate module (not shown). In addition, the BER may be determined based on a number of bit errors and a total number of transferred bits in for example, acknowledgement (ACK) and/or negative-acknowledgement (NACK) data packets, transferred between the MS 110 and the BS 115. The BER may be expressed as a function of the CINR, for instance. In the case of a determination that a BER is within the at least one predetermined range, the trigger event signal would be sent to indicate to the MS 110 that a next CQI should be sent in the x-bit or larger-bit modulation scheme, e.g., the 6-bit modulation scheme.

In embodiments, a trigger event may include a determination that a MS Tx power head room is within at least one predetermined range, e.g., the MS 110 is operating outside its predetermined normal operating range of the MS Tx power head room. The MS Tx power head room is a difference between a maximum power of a transmitter of the MS 110 and a transmission power required for a particular data rate and/or MCS level, and may be expressed as decibels (dB). The MS Tx power head room may be determined by the BS 115 via the event detection module 310 and/or via a separate module (not shown). The MS Tx power head room may also or alternatively be received by the BS 115 from the MS 110, for example. In the case of a determination that a MS Tx power head room is within the at least one predetermined range, the trigger event signal would be sent to indicate to the MS 110 that a next CQI should be sent in the x-bit or larger-bit modulation scheme, e.g., the 6-bit modulation scheme.

The BS 115 further includes the CQICH allocation module 315 that allocate CQICH's of the fast-feedback channels between the MS 110 and the BS 115. Specifically, in embodiments, a predetermined number of the CQI channels may be allocated to send one CQI per user device (e.g., the MS 110) in the y-bit or 3-bit modulation scheme. A remaining number of the CQI channels may be allocated to send one CQI per user device in the x-bit or 6-bit modulation scheme. For each of the CQI channels allocated to send one CQI per user device in the x-bit or 6-bit modulation scheme, the same CQI channels may be allocated to send one CQI to two user devices in the y-bit or 3-bit modulation scheme.

In embodiments, a predetermined percentage of the CQI channels may be allocated to send one CQI per user device in the x-bit or 6-bit modulation scheme. This predetermined percentage of the CQI channels allocated to send the CQI in the x-bit modulation scheme may be zero. A remaining percentage of the CQI channels may be allocated to send one CQI per user device in the y-bit or 3-bit modulation scheme. In this case, when a percentage of the CQI channels allocated to send the CQI in the x-bit modulation scheme is equal to zero, and a CQI channel is needed to send the CQI in the x-bit modulation scheme (e.g., a trigger event is determined), at least one CQI channel allocated to send the CQI in the y-bit modulation scheme may be randomly reallocated to send the CQI in the x-bit modulation scheme.

In embodiments, the CQICH allocation module 315 may further categorize user devices (e.g., the MS 110) connected to the BS 115 to a channel conditions stable group or a channel conditions unstable group based on a channel stability. The BS 115 may determine the channel stability based on performance metrics, such as, for example, the CINR. In this case, when a percentage of the CQI channels allocated to send the CQI in the x-bit modulation scheme is equal to zero, and a CQI channel is needed to send the CQI in the x-bit modulation scheme, at least one CQI channel allocated to send the CQI in the y-bit modulation scheme from the at least one user device in the stable group may be reallocated to send the CQI in the x-bit modulation scheme. In other words, the CQICH allocation module 315 may select the user devices from the stable group to send the CQI in the x-bit or larger-bit modulation scheme. Advantageously, through the CQICH allocation module 315, the CQICH's may be optimally allocated for a maximum capacity of user devices by utilizing the x-bit modulation scheme only when necessary, while maintaining channel stability.

Figure 4A:
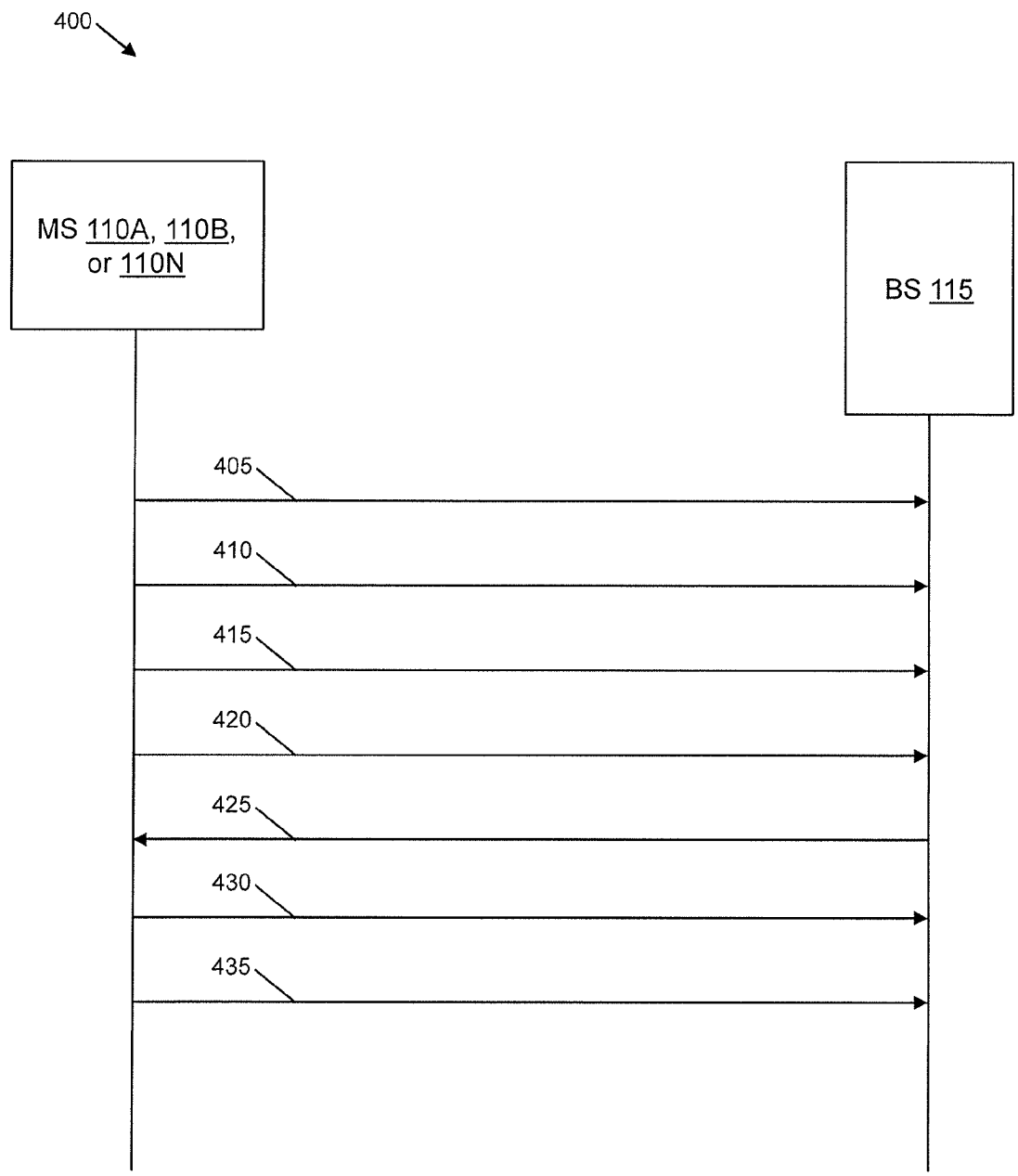
FIG. 4A is a data flow diagram that shows exemplary data flow between the MS and the BS in FIG. 1 in accordance with aspects of the invention.

FIG. 4A is a data flow diagram 400 that shows exemplary data flow between the MS 110 and the BS 115 in FIG. 1 in accordance with aspects of the invention. In embodiments, the MS 110 may initially send to the BS 115 a CQI 405 in a x-bit or 6-bit modulation scheme. For example, the CQI 405 may include a 6-bit payload of bits "001010", which indicate a CQI level of 10. The MS 110 may then send to the BS 115 a CQI 410 in a y-bit or 3-bit modulation scheme. For instance, the CQI 410 may include a 3-bit payload of bits "000", which indicate no change between a current CQI level and the previous CQI level of 10.

The MS 110 may continue to send to the BS 115 CQI's 415 and 420 in the y-bit or 3-bit modulation scheme. In additional examples, the CQI's 415 and 420 may include bits "010" and "001", respectively, which indicate decrements (e.g., −2 and −1, respectively, as shown in Table 4 above) in previous CQI levels. Upon determination of a trigger event, the BS 115 may send to the MS 110 a trigger event signal 425 indicating that the trigger event has been detected by the BS 115 and that the MS 110 should send a next CQI in the x-bit or 6-bit modulation scheme due to the trigger event. For example, the trigger event may include a determination that a BER is within at least one predetermined range.

Upon detection of the trigger event, the MS 110 may send to the BS 115 a CQI 430 in the x-bit or 6-bit modulation scheme. For example, the CQI 430 may include a G-bit payload of bits "001010", which indicate a CQI level of 10. The MS 110 may then return to the y-bit or 3-bit modulation scheme and send to the BS 115 a CQI 435 in the y-bit modulation scheme. For instance, the CQI 435 may include a 3-bit payload of bits "000" indicating no change between a current CQI level and the previous CQI level of 10.

Figure 4B:
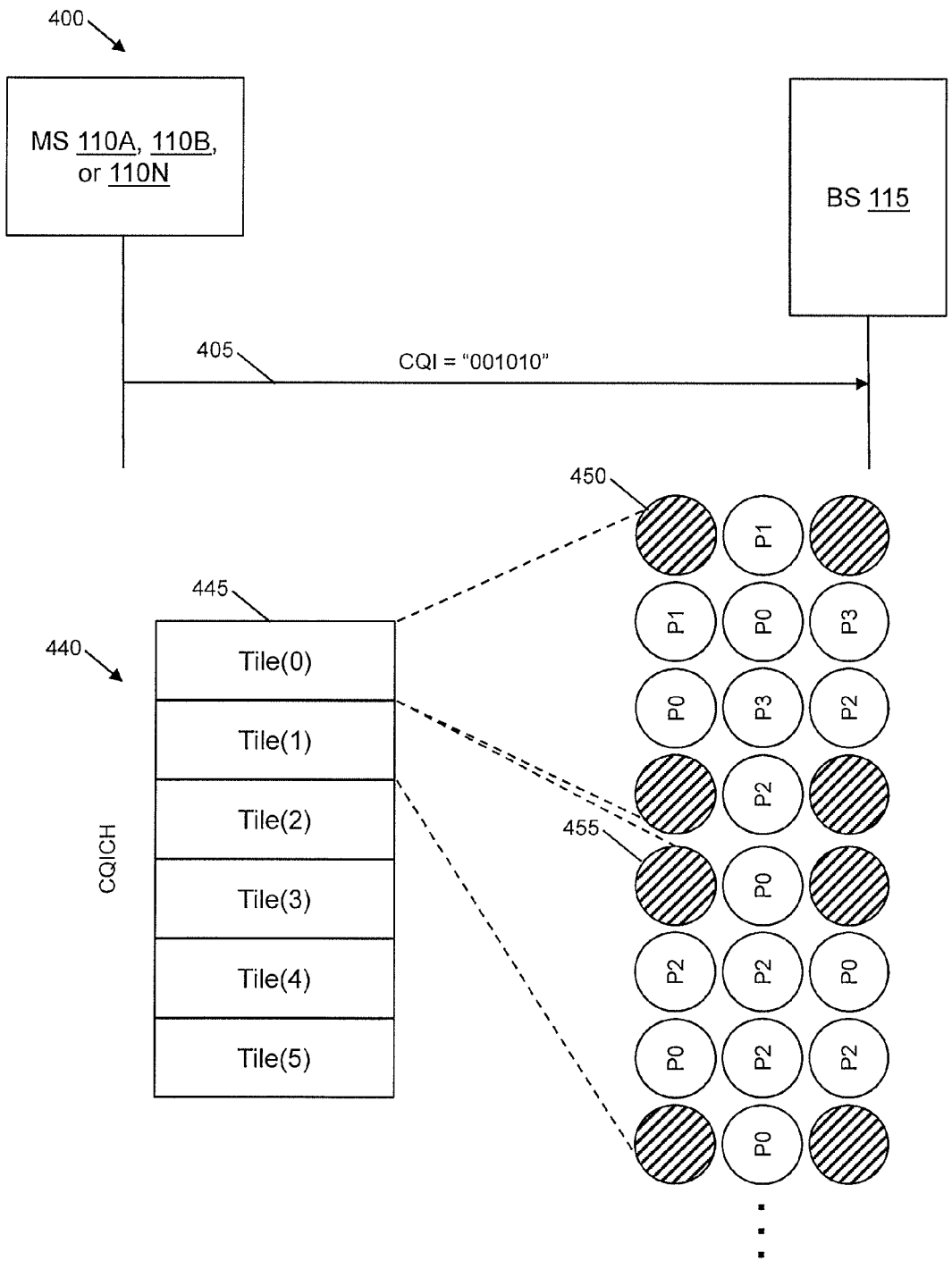
FIG. 4B shows a portion of the exemplary data flow in FIG. 4A, and an exemplary block diagram of the payload encoding and modulation for channel quality feedback in a 6-bit modulation scheme in accordance with aspects of the invention.

FIG. 4B shows a portion of the exemplary data flow diagram 400 in FIG. 4A, and an exemplary block diagram 440 of the payload encoding and modulation for channel quality feedback in the 6-bit modulation scheme in accordance with aspects of the invention. In particular, the MS 110 is sending to the BS 115 the CQI 405 including the 6-bit payload of the bits "001010", which indicate the CQI level of 10. The block diagram 440 shows CQICH's 445 that include Tile(0), Tile(1), . . . , and Tile(5). For example, the Tile(0) of the CQICH's 445 include subcarriers 450 that indicate orthogonal modulation symbols "P0, P1, P2, P3, P0, P1, P2, P3" for a fast-feedback vector index of "0." In another example, the Tile(1) of the CQICH's 445 include subcarriers 455 that indicate orthogonal modulation symbols "P0, P2, P0, P2, P2, P0, P2, P0" for a fast-feedback vector index of "6." Subcarriers at corners of the subcarriers 450, 455 are pilot carriers including measurements of channel conditions, for instance, an equalizer gain for each of the subcarriers 450, 455.

Figure 4C:
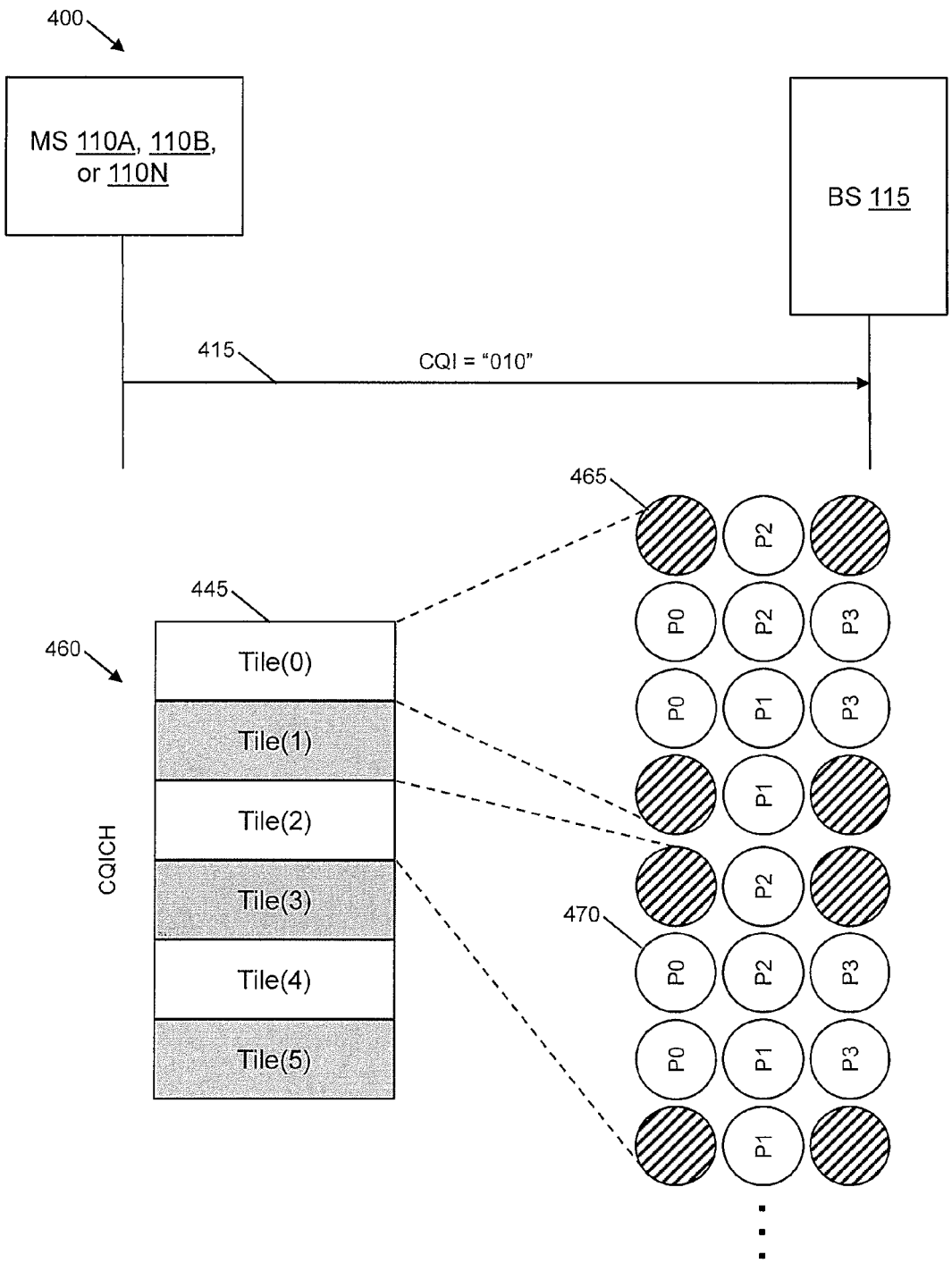
FIG. 4C shows another portion of the exemplary data flow in FIG. 4A, and an exemplary block diagram of the payload encoding and modulation for channel quality feedback in a 3-bit modulation scheme in accordance with aspects of the invention.

FIG. 4C shows another portion of the exemplary data flow diagram 400 in FIG. 4A, and an exemplary block diagram 460 of the payload encoding and modulation for channel quality feedback in the 3-bit modulation scheme in accordance with aspects of the invention. In particular, the MS 110 is sending to the BS 115 the CQI 415 including the 3-bit payload of the bits "010", which indicate a decrement of −2 CQI levels in the previous CQI level of 10. The block diagram 460 shows CQICH's 445 that include Tile(0), Tile(1), . . . , and Tile(5). For example, the Tile(0) of the CQICH's 445 include subcarriers 465 that indicate orthogonal modulation symbols "P0, P0, P1, P1, P2, P2, P3, P3" for a fast-feedback vector index of "2." In another example, the Tile(2) of the CQICH's 445 include subcarriers 470 that indicate orthogonal modulation symbols "P0, P0, P1, P1, P2, P2, P3, P3" for a fast-feedback vector index of "2." Subcarriers at corners of the subcarriers 465, 470 are pilot carriers including measurements of channel conditions, for example, an equalizer gain for each of the subcarriers 465, 470. In this case, the Tile(1), the Tile(3), and the Tile(5) are not required to send any orthogonal modulation symbols representing the 3-bit payload and thus, can be reallocated for other user devices.

Figure 5:
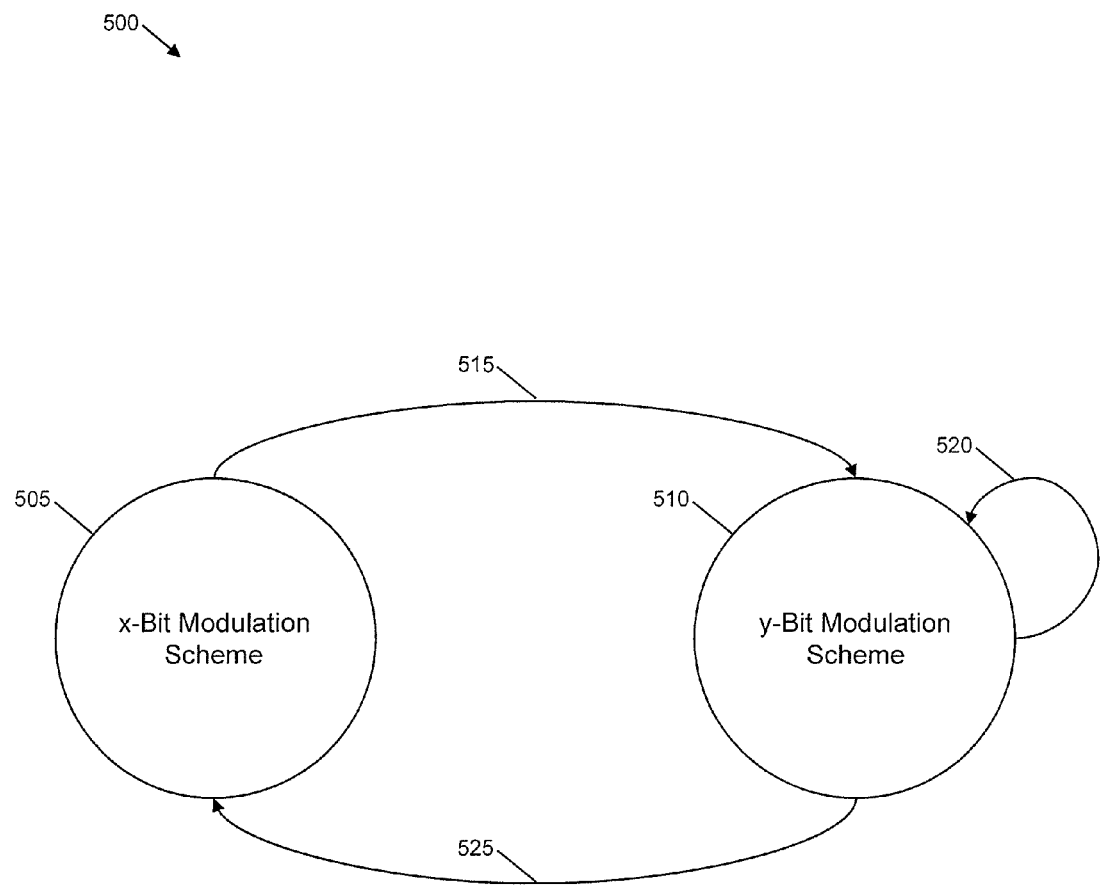
FIG. 5 is a flow diagram that shows an exemplary process for the payload encoding and modulation for channel quality feedback in a combined x-bit modulation scheme and a y-bit modulation scheme in accordance with aspects of the invention.

FIG. 5 is a flow diagram that shows an exemplary process 500 for the payload encoding and modulation for channel quality feedback in a combined x-bit modulation scheme 505 and a y-bit modulation scheme 510 in accordance with aspects of the invention. In embodiments, the x-bit modulation scheme 505 and the y-bit modulation scheme 510 may include a 6-bit modulation scheme and a 3-bit modulation scheme, respectively. The process 500 starts with a MS 110 sending to a BS 115 a CQI in the x-bit modulation scheme 505. After the CQI in the x-bit modulation scheme is sent, at step 515, the process 500 flows to the y-bit modulation scheme 510. In other words, the MS 110 sends to the BS 115 a CQI in the y-bit modulation scheme 510.

At step 520, the process 500 repeats at the y-bit modulation scheme 510. That is, the MS 110 sends to the BS 115 a CQI in the y-bit modulation scheme 510 until the MS 110 detects a trigger event signal received from the BS 115. When the MS 110 does detect the trigger event signal, at step 525, the process 500 flows to the x-bit modulation scheme 505. In other words, the MS 110 sends to the BS 115 a CQI in the x-bit modulation scheme 505 at an as needed basis.

Figure 6A:
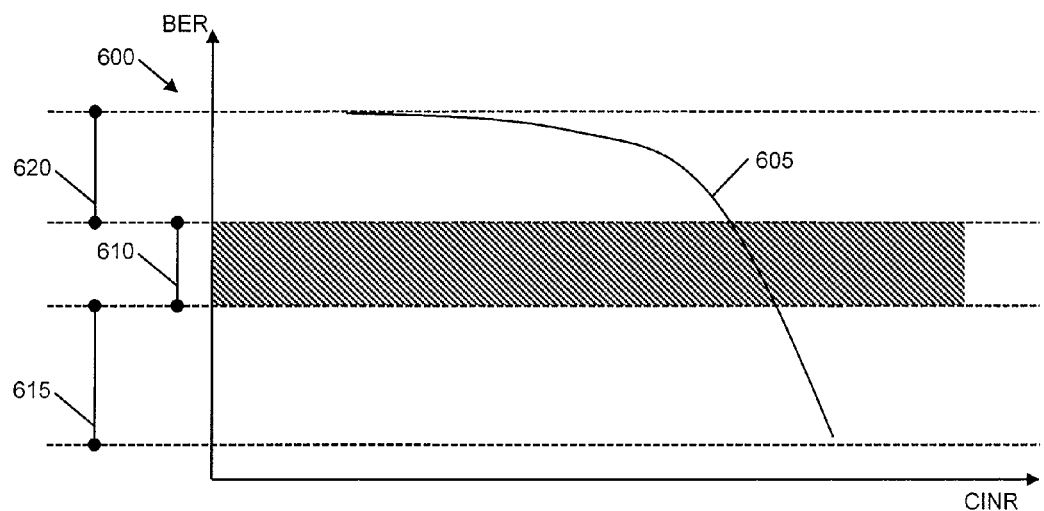
FIG. 6A is a two-dimensional graph that shows an exemplary relationship between a bit error rate (BER) and a carrier to interference-plus-noise ratio (CINR) to be used when determining a trigger event of the payload encoding and modulation for channel quality feedback in accordance with aspects of the invention.

FIG. 6A is a two-dimensional graph 600 that shows an exemplary relationship 605 between a BER and a CINR to be used when determining a trigger event of the payload encoding and modulation for channel quality feedback in accordance with aspects of the invention. The relationship 605 between the BER and the CINR may be, for example, a decreasing BER as the CINR increases. The BS 115 may use the relationship 605 between the BER and the CINR to determine whether there is a trigger event to indicate to the MS 110 to switch from the y-bit modulation scheme to the x-bit modulation scheme. In embodiments, when the BER is within a predetermined normal operating range 610, the BS 115 may determine that there is no trigger event. However, when the BER is outside the normal operating range 610 and is within either a predetermined range 615 or a predetermined range 620, the BS 115 may determine that there is a trigger event.

Figure 6B:
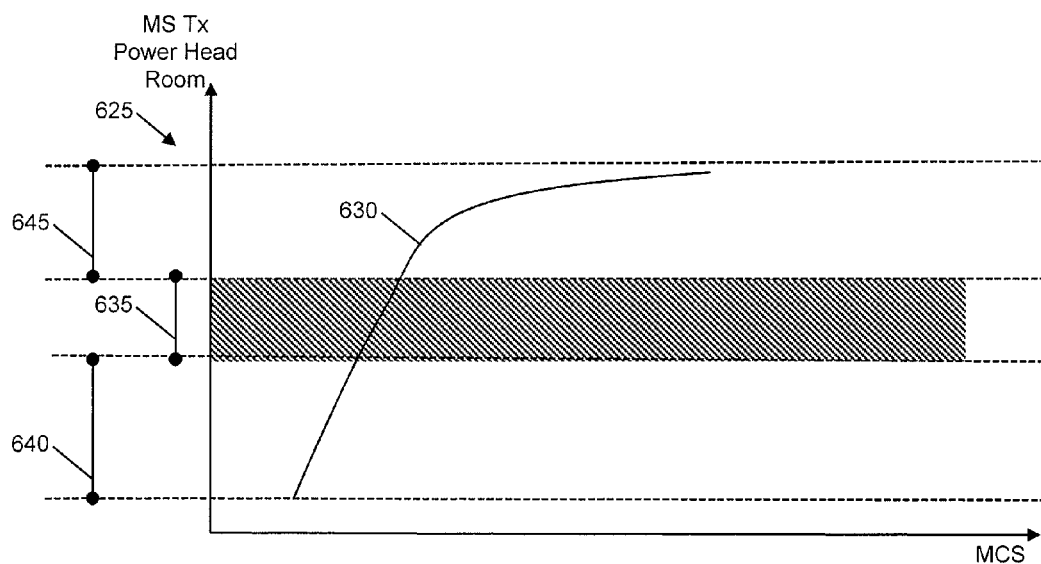
FIG. 6B is a two-dimensional graph that shows an exemplary relationship between a MS transmission (Tx) power head room and a modulation and coding scheme (MCS) to be used when determining a trigger event of the payload encoding and modulation for channel quality feedback in accordance with aspects of the invention.

FIG. 6B is a two-dimensional graph 625 that shows an exemplary relationship 630 between a MS Tx power head room and a MCS to be used when determining a trigger event of the payload encoding and modulation for channel quality feedback in accordance with aspects of the invention. The relationship 630 between the MS Tx power head room and the MCS may be, for example, an increasing MS Tx power head room as a MCS level increases. The BS 115 may use the relationship 630 between the Ms Tx power head room and the MCS to determine whether there is a trigger event to indicate to the MS 110 to switch from the y-bit modulation scheme to the x-bit modulation scheme. In embodiments, when the MS Tx power head room is within a predetermined normal operating range 635, the BS 115 may determine that there is no trigger event. However, when the MS Tx power head room is outside the normal operating range 635 and is within either a predetermined range 640 or a predetermined range 645, the BS 115 may determine that there is a trigger event.

Figure 7:
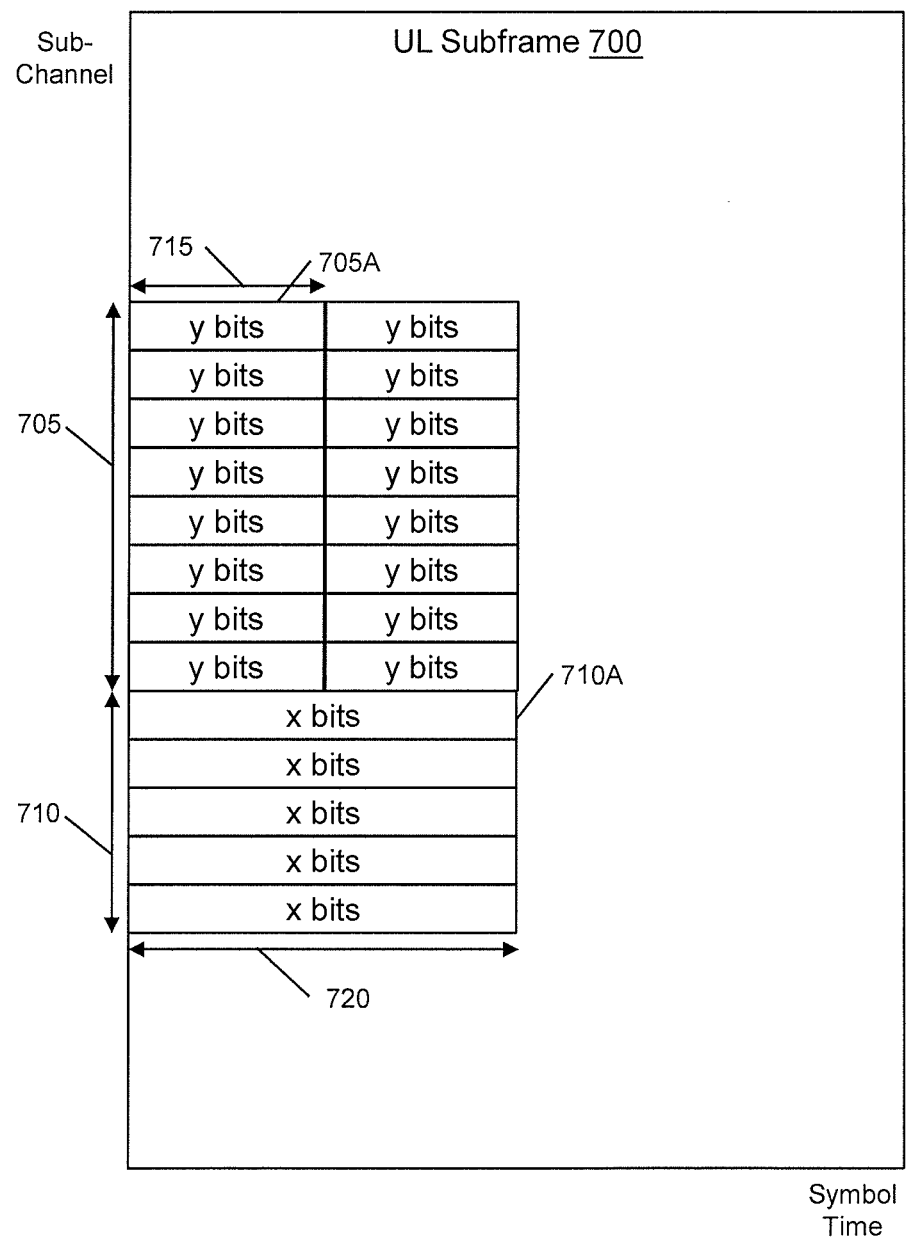
FIG. 7 is a block diagram that shows an exemplary uplink (UL) subframe sent from the MS to the BS in FIG. 1 in accordance with aspects of the invention.

FIG. 7 is a block diagram that shows an exemplary uplink (UL) subframe 700 sent from the MS 110 to the BS 115 in FIG. 1 in accordance with aspects of the invention. In embodiments, the UL subframe 700 may be a subframe of for example, a WiMAX network. The UL subframe 700 includes a plurality of frequency sub-channels over a period of time, specifically, a symbol time. Each of the sub-channels may be allocated to a user device (e.g., the MS 110) for a period of the symbol time, to send, for instance, control information (e.g., a CQI) and/or data bursts.

For example, sub-channels 705 may be allocated to a plurality of user devices for a period of the symbol time, to send one CQI per user device in the y-bit or 3-bit modulation scheme. Sub-channels 710 may be allocated to another plurality of user devices for the period of the symbol time, to send one CQI per user device in the x-bit or 6-bit modulation scheme.

More specifically, a sub-channel 705A may be allocated to a first user device for a first period of the symbol time 715, to send one CQI in the y-bit modulation scheme. A sub-channel 710A may be allocated to a second user device for a second period of the symbol time 720, to send one CQI in the x-bit modulation scheme. As shown in the UL subframe 700, in the second period of the symbol time 720 it takes the second user device to send one CQI in the x-bit modulation scheme, two users devices, including the first user device, can each send one CQI in the y-bit modulation scheme. This is due to the y-bit modulation scheme requiring less sub-channels to be sent.

In embodiments, a predetermined number of the sub-channels (e.g., the sub-channels 705) may be allocated to send one CQI per user device in the y-bit or 3-bit modulation scheme. A remaining number of the sub-channels (e.g., the sub-channels 710) may be allocated to send one CQI per user device in the x-bit or 6-bit modulation scheme. Alternatively, a predetermined percentage of the sub-channels (e.g., the sub-channels 710) may be allocated to send one CQI per user device in the x-bit or 6-bit modulation scheme. A remaining percentage of the sub-channels (e.g., the sub-channels 705) may be allocated to send one CQI per user device in the y-bit or 3-bit modulation scheme. In the latter case, when a percentage of the CQI channels allocated to send the CQI in the x-bit modulation scheme is equal to zero, and a CQI channel is needed to send the CQI in the x-bit modulation scheme (e.g., a trigger event is determined), at least one CQI channel allocated to send the CQI in the y-bit modulation scheme may be randomly chosen to be removed from sending the CQI in the y-bit modulation scheme and to be reallocated to send the one CQI in the x-bit modulation scheme.

In embodiments, user devices may be categorized to a channel conditions stable group or a channel conditions unstable group based on a channel stability. In this case, when a percentage of the CQI channels allocated to send the CQI in the x-bit modulation scheme is equal to zero, and a CQI channel is needed to send the CQI in the x-bit modulation scheme, at least one CQI channel allocated to send the CQI in the y-bit modulation scheme from the at least one user device in the stable group may be chosen to be reallocated to send the CQI in the x-bit modulation scheme.

Figure 8:
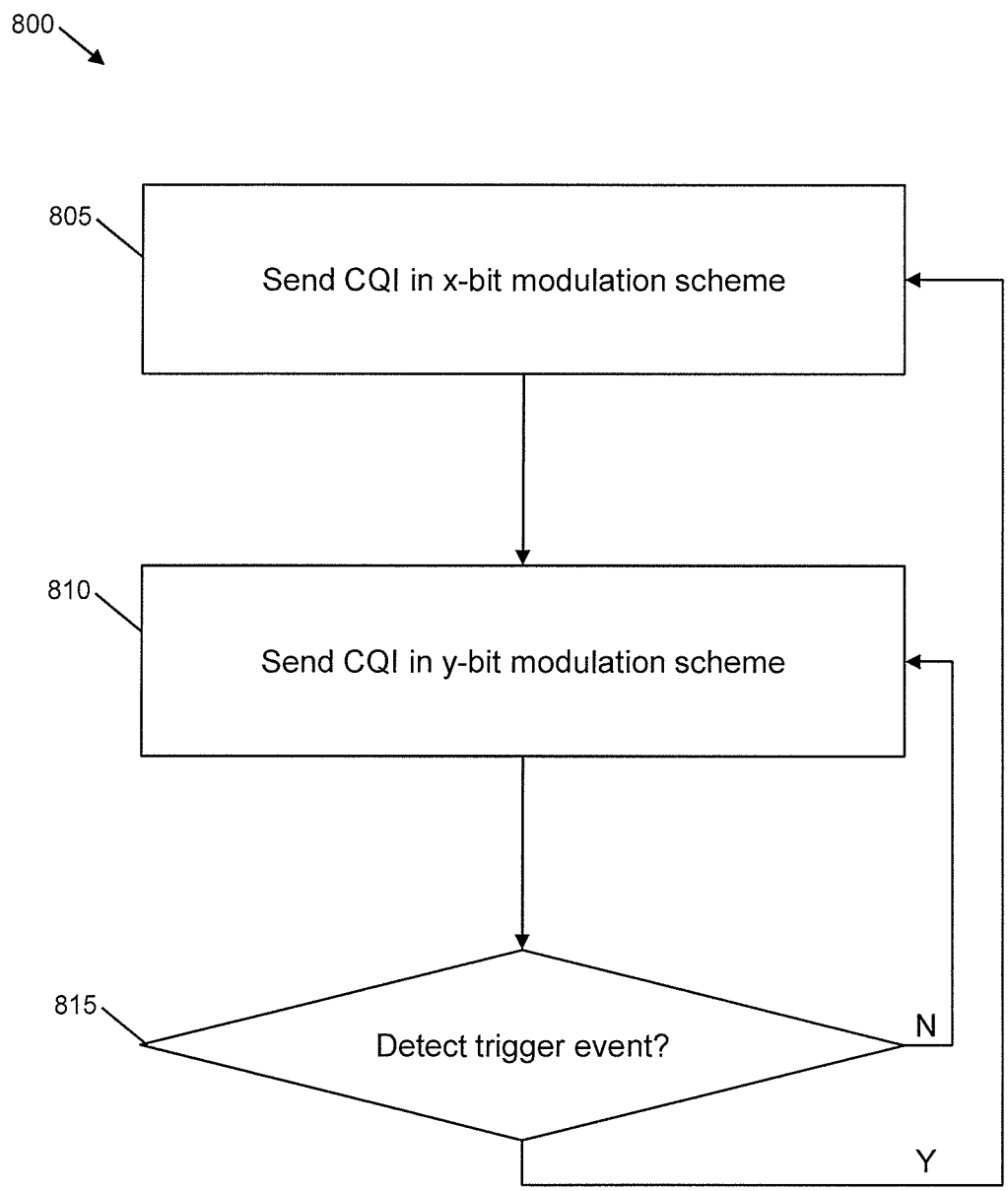
FIG. 8 is a flow diagram that shows an exemplary process of the MS in FIG. 1 of the payload encoding and modulation for channel quality feedback in accordance with aspects of the invention.

FIG. 8 is a flow diagram that shows an exemplary process 800 of the MS 110 in FIG. 1 of the payload encoding and modulation for channel quality feedback in accordance with aspects of the invention. At step 805, the MS 110 sends a CQI to the BS 115 in the x-bit or 6-bit modulation scheme. At step 810, the MS 110 sends another CQI to the BS 115 in the y-bit or 3-bit modulation scheme. At step 815, the MS 110 detects whether a trigger event signal is received from the BS 115 that indicates that a trigger event has been determined by the BS 115. If the MS 110 detects that the trigger event signal is received, then the process 800 returns to step 805. Otherwise, the process 800 returns to step 810. Advantageously, the MS 110 may send the y-bit or smaller-bit modulation scheme until the MS 110 detects the trigger event signal received from the BS 115.

Figure 9:
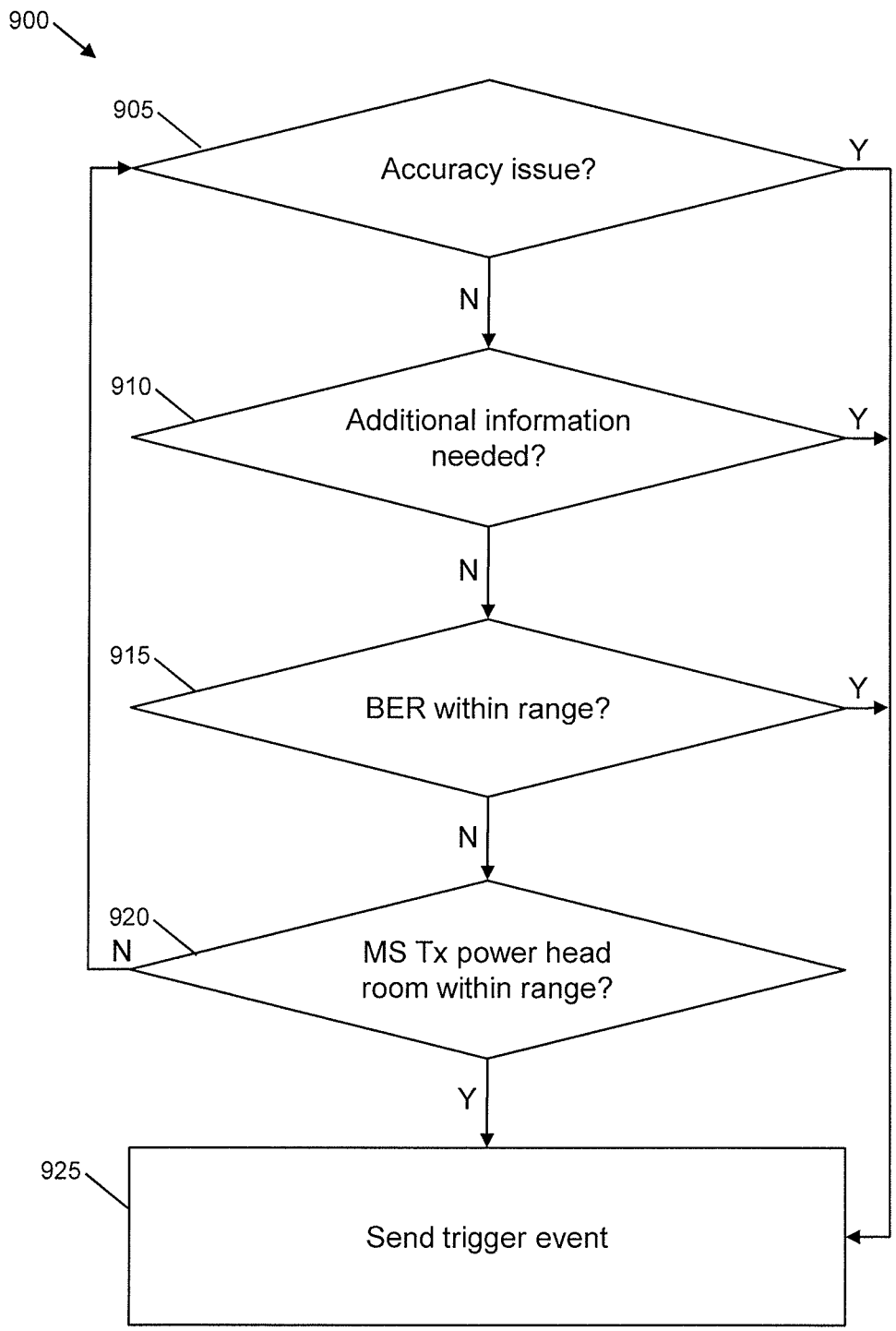
FIG. 9 is a flow diagram that shows an exemplary process of the BS in FIG. 1 of determining a trigger event of the payload encoding and modulation for channel quality feedback in accordance with aspects of the invention.

FIG. 9 is a flow diagram that shows an exemplary process 900 of the BS 115 in FIG. 1 of determining a trigger event of the payload encoding and modulation for channel quality feedback in accordance with aspects of the invention. At step 905, the BS 115 detects whether there is an accuracy issue with respect to a CQI received from the MS 110. If the BS 115 detects the accuracy issue, then the process 900 continues at step 925. Otherwise, the process 900 continues at step 910.

At step 910, the BS 115 detects whether additional information is needed with respect to a CQI received from the MS 110. If the BS 115 detects that additional information is needed, then the process 900 continues at step 925. Otherwise, the process 900 continues at step 915. At step 915, the BS 115 determines whether a BER is within at least one predetermined range. If the BS 115 determines that the BER is within the at least one predetermined range, then the process 900 continues at step 925. Otherwise, the process 900 continues at step 920.

At step 920, the BS 115 determines whether a MS Tx power head room is within at least one predetermined range. If the BS 115 determines that the MS Tx power head room is within the at least one predetermined range, then the process 900 continues at step 925. Otherwise, the process 900 returns to step 905. At step 925, the BS 115 sends a trigger event signal to the MS 110 that indicates that the BS 115 has determined that there is a trigger event and that a next CQI sent by the MS 110 should be sent in a x-bit or larger-bit modulation scheme.

Figure 10:
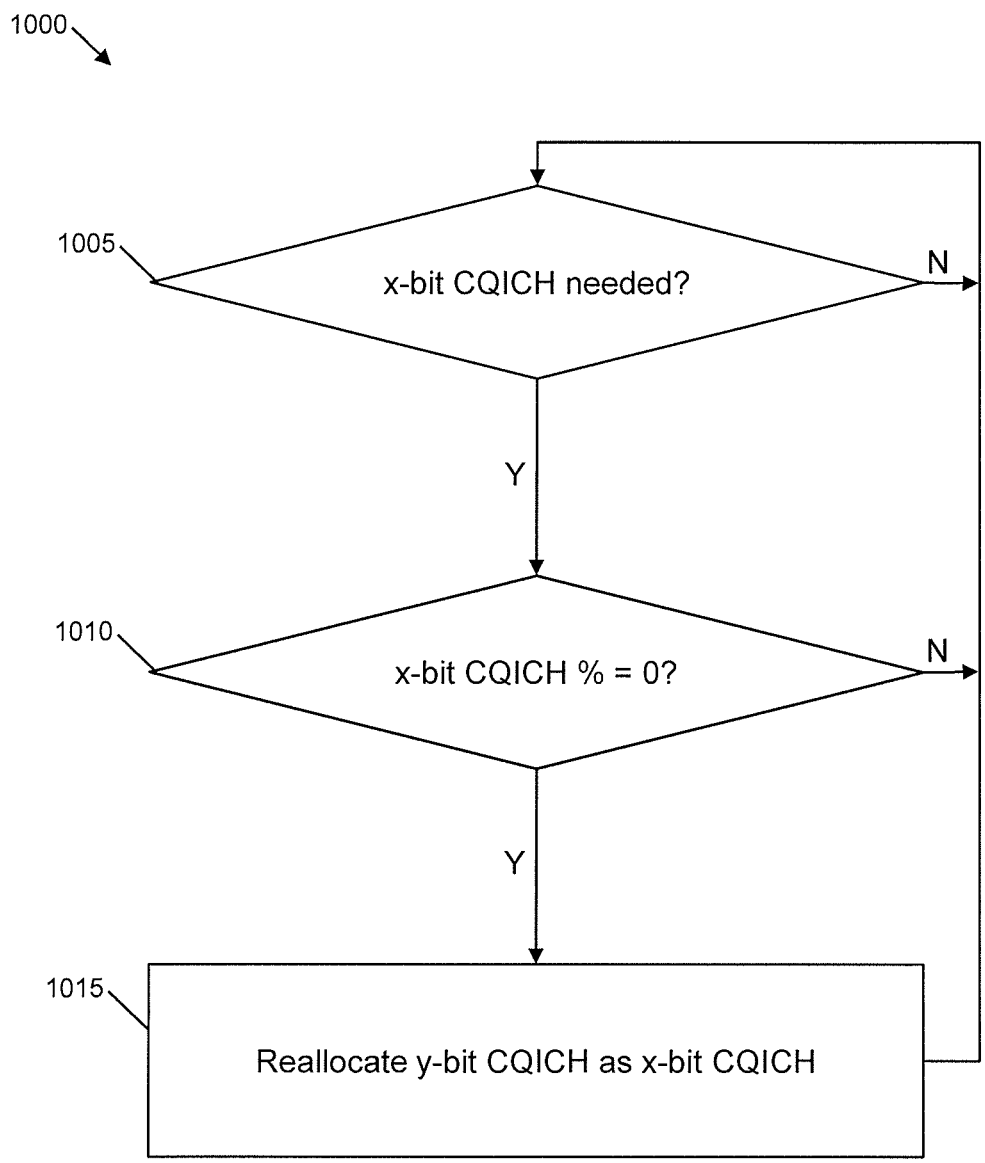
FIG. 10 is a flow diagram that shows an exemplary process of the BS in FIG. 1 of allocating a channel quality indicator channel (CQICH) for the payload encoding and modulation for channel quality feedback in accordance with aspects of the invention.

FIG. 10 is a flow diagram that shows an exemplary process 1000 of the BS 115 in FIG. 1 of allocating CQICH's for the payload encoding and modulation for channel quality feedback in accordance with aspects of the invention. At step 1005, the BS 115 determines whether a CQICH is needed to send one CQI in the x-bit or 6-bit modulation scheme, e.g., a trigger event is determined. If the BS 115 determines that the CQICH is needed, then the process 1000 continues at step 1010. Otherwise, the process 1000 returns to step 1005.

At step 1010, the BS 115 determines whether a percentage of CQICH's allocated to send one CQI in the x-bit modulation scheme is equal to zero. If the BS 115 determines that the percentage of CQICH's allocated to send the CQI in the x-bit modulation scheme is zero, then the process 1000 continues at step 1015. Otherwise, the process 1000 returns to step 1005. At step 1015, the BS 115 reallocates at least one CQICH allocated to send one CQI in the y-bit modulation scheme as a CQICH allocated to send one CQI in the x-bit modulation scheme. In embodiments, this reallocation may include randomly selecting the CQICH allocated to send the CQI in the y-bit modulation scheme, or selecting the CQICH allocated to send the CQI in the y-bit modulation scheme from at least one user device in a channel conditions stable group. Advantageously, CQICH's may be optimally allocated for a maximum capacity of user devices by utilizing the x-bit or larger-bit modulation scheme only when necessary, while maintaining channel stability.

Examples of the MS 110 may include any one or more of, for instance, a personal computer, portable computer, personal digital assistant (PDA), workstation, web-enabled mobile phone, WAP device, web-to-voice device, or other device. Those having skill in the art will appreciate that the embodiments described herein may work with various system configurations.

In addition, various embodiments of the disclosure may be made in hardware, firmware, software, or any suitable combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific example embodiments of the disclosure, and performing certain actions. However, it will be apparent that such descriptions are merely for convenience and that such actions in fact result from computing devices, processors, controllers, or other devices executing the firmware, software, routines, or instructions.

Various embodiments described herein are describe as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to the provided description without departing from the scope or spirit of the disclosure.

For example, although illustrated as part of the MS 110, the CQI encoding/modulation module 210 may be part of the MS 110 or separate from the MS 110 so long as the MS 110 is associated with or otherwise accesses functions the CQI encoding/modulation module 210. Furthermore, the transceivers 205 and 305 may be separate receivers and transmitters (not shown), without departing from the scope of this disclosure.

Other embodiments, uses and features of the present disclosure will be apparent to those skilled in the art from consideration of the specification and practice of the inventive concepts disclosed herein. The specification and drawings should be considered exemplary only, and the scope of the disclosure is accordingly intended to be limited only by the following claims.

What is claimed is:

1. A method, comprising:
   receiving at a base station a Channel Quality Indicator (CQI) in a x-bit modulation scheme representative of a CQI level of a communication link between a wireless device and the base station;
   receiving at the base station at least one CQI in a y-bit modulation scheme from the wireless device after receiving the CQI in the x-bit modulation scheme, wherein the CQI in the y-bit modulation scheme comprises less bits than the CQI in the x-bit modulation scheme and wherein the CQI in the y-bit modulation scheme is indicative of a determined increment by which the CQI level of the communication link has increased or a determined decrement of by which the CQI level of the communication link has decreased as compared to the CQI level sent in the x-bit modulation scheme;
   determining at the base station whether a trigger event occurred based on the received CQI in the y-bit modulation scheme; and
   instructing the wireless device to send the CQI in the x-bit modulation scheme after sending the CQI in the y-bit modulation scheme when the base station determines that the trigger event occurred.

2. The method of claim 1, wherein:
   the x-bit modulation scheme comprises a 6-bit modulation scheme; and
   the y-bit modulation scheme comprises a 3-bit modulation scheme.

3. The method of claim 1, wherein the trigger event comprises a detection of at least one of an accuracy issue and a need for additional information to be delivered.

4. The method of claim 1, wherein the trigger event comprises a determination that a bit error rate (BER) is within at least one predetermined range.

5. The method of claim 1, wherein the trigger event comprises a determination that a mobile station transmission power head room is within at least one predetermined range.

6. The method of claim 1, wherein:
   a predetermined number of CQI channels are allocated to send one CQI per user device in the y-bit modulation scheme; and
   a remaining number of the CQI channels are allocated to send the one CQI in the x-bit modulation scheme.

7. The method of claim 1, wherein:
   a predetermined percentage of CQI channels are allocated to send one CQI per user device in the x-bit modulation scheme; and
   a remaining percentage of the CQI channels are allocated to send the one CQI in the y-bit modulation scheme.

8. The method of claim 7, wherein when a percentage of the CQI channels allocated to send the one CQI in the x-bit modulation scheme is equal to zero, and a CQI channel is needed to send the one CQI in the x-bit modulation scheme, at least one CQI channel allocated to send the one CQI in the y-bit modulation scheme is randomly reallocated to send the one CQI in the x-bit modulation scheme.

9. The method of claim 7, wherein:
   at least one user device of a network is categorized in a channel conditions stable group;
   at least one other user device of the network is categorized in a channel conditions unstable group; and
   when a percentage of the CQI channels allocated to send the one CQI in the x-bit modulation scheme is equal to zero, and a CQI channel is needed to send the one CQI in the x-bit modulation scheme, at least one CQI channel allocated to send the one CQI in the y-bit modulation scheme from the at least one user device in the channel conditions stable group is reallocated to send the one CQI in the x-bit modulation scheme.

10. A computer program product comprising a non-transitory computer readable storage medium having readable program code embodied in the storage medium, the computer program product includes at least one component operable to:
   receive a Channel Quality Indicator (CQI) in a x-bit modulation scheme representative of a CQI level of a communication link between a wireless device and a base station from the wireless device;
   receive at least one CQI in a y-bit modulation scheme from the wireless device after the CQI in the x-bit modulation scheme is received, wherein the CQI in the y-bit modulation scheme comprises less bits than the CQI in the x-bit modulation scheme and wherein the CQI in the y-bit modulation scheme is indicative of a determined increment by which the CQI level of the communication link has decreased or a determined decrement by which the CQI level of the communication link has decreased as compared to the CQI level sent in the x-bit modulation scheme;
   determine whether a trigger event occurred based on the received CQI in the y-bit modulation scheme; and
   instruct the wireless device to send the CQI in the x-bit modulation scheme after sending the CQI in the y-bit modulation scheme when it is determined that the trigger event occurred.

11. The computer program product of claim 10, wherein:
the x-bit modulation scheme comprises a 6-bit modulation scheme; and
the y-bit modulation scheme comprises a 3-bit modulation scheme.

12. The computer program product of claim 10, wherein the trigger event comprises a detection of at least one of an accuracy issue and a need for additional information to be delivered.

13. The computer program product of claim 10, wherein the trigger event comprises a determination that a bit error rate (BER) is within at least one predetermined range.

14. The computer program product of claim 10, wherein the trigger event comprises a determination that a mobile station transmission power head room is within at least one predetermined range.

15. The computer program product of claim 10, wherein: a predetermined number of CQI channels are allocated to send one CQI per user device in the y-bit modulation scheme; and remaining number of the CQI channels are allocated to send the one CQI in the x-bit modulation scheme.

16. The computer program product readable medium of claim 10, wherein: a predetermined percentage of CQI channels are allocated to send one CQI per user device in the x-bit modulation scheme; and
a remaining percentage of the CQI channels are allocated to send the one CQI in the y-bit modulation scheme.

17. The computer program product of claim 16, wherein when a percentage of the CQI channels allocated to send the one CQI in the x-bit modulation scheme is equal to zero, and a CQI channel is needed to send the one CQI in the x-bit modulation scheme, at least one CQI channel allocated to send the one CQI in the y-bit modulation scheme is randomly reallocated to send the one CQI in the x-bit modulation scheme.

18. The computer program product of claim 16, wherein: at least one user device of a network is categorized in a channel conditions stable group;
at least one other user device of the network is categorized in a channel conditions unstable group; and
when a percentage of the CQI channels allocated to send the one CQI in the x-bit modulation scheme is equal to zero, and a CQI channel is needed to send the one CQI in the x-bit modulation scheme, at least one CQI channel allocated to send the one CQI in the y-bit modulation scheme from the at least one user device in the channel conditions stable group is reallocated to send the one CQI in the x-bit modulation scheme.

19. A system, comprising:
one or more processors configured to:
receive a Channel Quality Indicator (CQI) in a x-bit modulation scheme representative of a CQI level of a communication link between a wireless device and a base station;
receive at least one CQI in a y-bit modulation scheme from the wireless device after the CQI in the x-bit modulation scheme is received, wherein the CQI in the y-bit modulation scheme comprises less bits than the CQI in the x-bit modulation scheme, and wherein the CQI in the y-bit modulation scheme is indicative of a determined increment by which the CQI level of the communication link has increased or a determined decrement by which the CQI level of the communication link has decreased as compared to the CQI level sent in the x-bit modulation scheme;
determining whether a trigger event occurred based on the received CQI in the y-bit modulation scheme; and
instructing the wireless device to send the CQI in the x-bit modulation scheme after sending the CQI in the y-bit modulation scheme when it is determined that the trigger event occurred,
wherein the trigger event comprises at least one of a detection of at least one of an accuracy issue, a need for additional information to be delivered, a determination that a bit error rate (BER) is within at least one predetermined range, and a determination that a mobile station transmission power head room is within at least one predetermined range,
wherein a predetermined percentage of CQI channels are allocated to send one CQI per user device in the x-bit modulation scheme, and a remaining percentage of the CQI channels are allocated to send the one CQI in the y-bit modulation scheme, and wherein at least one user device of a network is categorized in a channel conditions stable group, at least one other user device of the network is categorized in a channel conditions unstable group, and when a percentage of the CQI channels allocated to send the one CQI in the x-bit modulation scheme is equal to zero, and a CQI channel is needed to send the one CQI in the x-bit modulation scheme, at least one CQI channel allocated to send the one CQI in the y-bit modulation scheme from the at least one user device in the channel conditions stable group is reallocated to send the one CQI in the x-bit modulation scheme.

20. The system of claim 19, wherein: the x-bit modulation scheme comprises a 6-bit modulation scheme; and the y-bit modulation scheme comprises a 3-bit modulation scheme.

* * * * *